United States Patent [19]
Grigoleit et al.

[11] 3,775,208
[45] Nov. 27, 1973

[54] METHOD OF APPLYING PROTECTIVE FILMS TO PLASTIC SURFACES THROUGH AN INTERMEDIATE STRATUM

[75] Inventors: Harry Grigoleit, Unterehrendingen; Max Kunzli, Wettingen, both of Switzerland

[73] Assignee: Aktiengesellschaft Brown, Boveri & Cie, Baden, Switzerland

[22] Filed: Aug. 17, 1971

[21] Appl. No.: 172,521

[30] Foreign Application Priority Data
Sept. 1, 1970 Switzerland.................... 13032/70

[52] U.S. Cl................ 156/178, 117/105.2, 161/89, 161/94, 161/154, 264/81, 264/257
[51] Int. Cl...... B32b 15/08, B05b 7/20, B29c 27/12
[58] Field of Search................. 117/105.2, 93.1 PF, 117/105; 161/89, 94; 264/257, 81; 156/82, 153, 154, 278, 178

[56] References Cited
UNITED STATES PATENTS
2,943,969   7/1960   Boyer et al. ................... 264/257 X
3,060,608   10/1962  Stahmann ..................... 264/257 X
2,038,937   4/1936   Jacobs ............................ 161/89
2,908,502   10/1959  Bradstreet et al. ............. 117/105.2
1,777,309   10/1930  Hopkinson ..................... 161/89 X
3,594,262   7/1971   Magidson ...................... 264/257 X
3,179,531   4/1965   Koubek ......................... 117/105.2 X
3,669,719   6/1972   Doede et al. .................. 117/93.1 PF
3,058,165   10/1962  Purvis ........................... 264/257 X

*Primary Examiner*—Philip Dier
*Attorney*—Pierce, Scheffler & Parker

[57] ABSTRACT

A method of protecting the surface of a moulded plastic part made from synthetic resin, fillers and/or fibers by application of a protective film of ceramic, metallic, or metallic-ceramic composition which is sprayed onto the surface of the parent material wherein the adhesion between the parent material and the sprayed-on protective film is improved by application of an intermediate stratum, in the form of a fabric or other mesh-like material made from an organic or inorganic substance, to the surface of the parent material prior to the spraying step. The mesh-like material is resistant to temperatures higher than the curing temperature of the synthetic resin and may be applied either simultaneously with production of the moulded plastic part and afterwards by means of adhesives.

7 Claims, 3 Drawing Figures

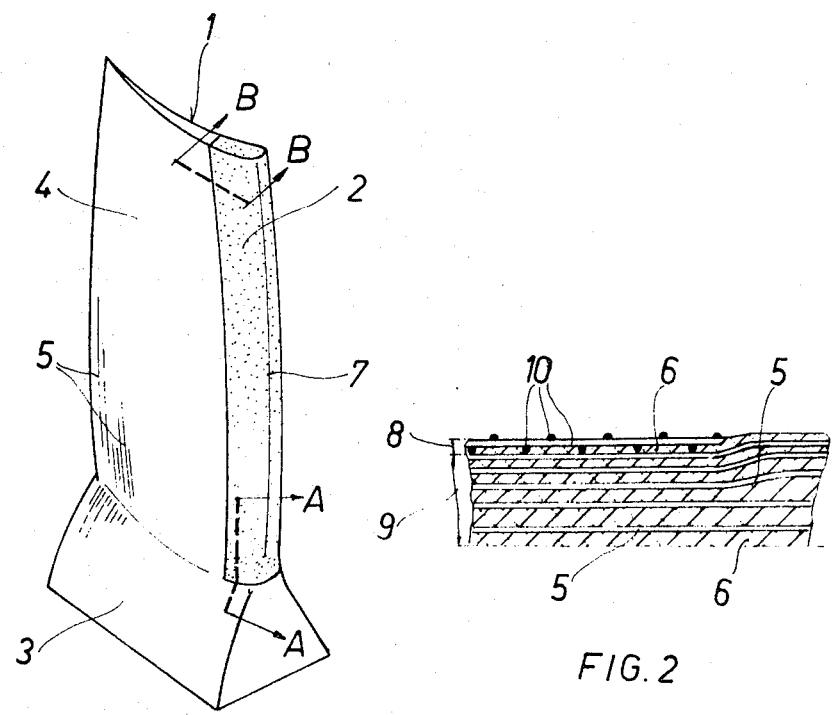
FIG.1
FIG.2
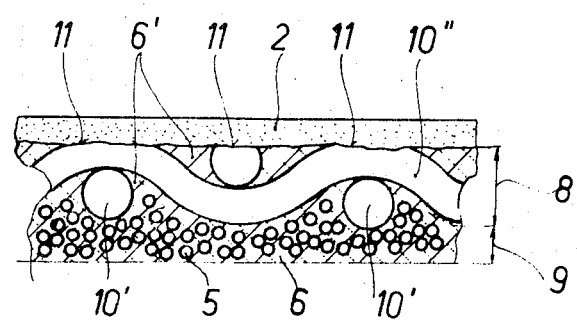
FIG.3

METHOD OF APPLYING PROTECTIVE FILMS TO PLASTIC SURFACES THROUGH AN INTERMEDIATE STRATUM

The present invention relates to an improved method for applying protective surface films on plastics, in particular moulded plastics, comprising fillers, synthetic resin and/or fibres, and wherein the melting point of the protective surface film is above the curing temperature of the synthetic resin.

Compared with metallic or ceramic materials, plastics have substantially lower resistance to abrasion, erosion and corrosion. It is therefore necessary to protect the surface of moulded plastics, in particular in the case of fibre-reinforced plastics, against abrasion and erosion since such external effects greatly impair the properties of the plastics.

It is known, for example, from German Pat. Specification No. 556,684, to cover moulded plastics with protective metallic films, the so-called gas flame-, electric arc-or plasma spraying methods being used to this end. In the interests of simplicity, these three methods will be referred to hereinafter only as flame spraying.

It is also known, from German Pat. Specification No. 605,761, to metallize plastics pressings, the pressing, after being metallized, being introduced into a heated press mould and the metallic film being fixedly bonded to the plastics pressing by pressure fusion.

The application of the protective film by the previously mentioned method would be possible in the case of fibre-reinforced plastics but it is not possible to achieve satisfactory adhesion between the parent material and the protective film. This results, on the one hand, in detachment of the protective film, or in the case of flame-spraying, it results in irreparable damage of the parent material surface, in particular of the reinforcing fibres.

The mechanical properties of fibre-reinforced plastics are thus in particular detrimentally affected.

The adhesion of ceramic or metallic protective surface films on plastics in accordance with the previously mentioned methods is based purely on mechanical anchoring of the protective film particles on the surface of the plastics, without any reference to chemical bonding. The surface texture of the plastics material determining the adhesion must be artificially produced in most cases since the kind of plastics in question naturally have smooth surfaces.

Fibre-reinforced plastics suffer from the initially mentioned disadvantage that mechanical roughening, for example, by sand blasting, causes damages to individual fibres of the mainly load-supporting parts and of the fibres which extend to the surface, or extend closely thereunder, so that entire fibre parts may become detached from the remainder of the material.

It is therefore the principal object of the present invention to avoid impairment of the mechanical properties and to avoid partially occurring detachment of the protective surface films from the parent material after, and during, flames spraying.

The solution to the problem according to the invention is solved in that an intermediate layer, resistant to temperatures which are higher than the curing temperature of the synthetic resin, is applied to the moulded plastic part whereupon the protective surface film is applied on to the intermediate layer, in known manner such as by flame spraying.

An advantageous embodiment of the method according to the invention is characterized in that the intermediate layer comprises a fabric or braiding, or other mesh-like material formed simultaneously with the synthetic resin and the fibres or fillers respectively into the desired plastics moulding.

The advantages of the method according to the invention are due to the improved adhesion of the applied protective film since the protective surface film, or the particles thereof, are able to penetrate between the individual pores of the fabric or other mesh-like material to achieve deep anchoring therein. Moreover, a further advantage is obtained by virtue of the fact that the intermediate stratum fabric parts, removed during flame spraying, have no negative effect on the mechanical and technological properties of the parent material. It is thus possible to increase the spraying pressure during flame spraying and for materials melting at elevated temperatures to be applied to the plastics components without the load-bearing moulding part being destroyed.

A further advantage of the method is characterized in that suitable matching of the fabric or other mesh-like material to the parent material, or of the protective surface film to the intermediate fabric layer, enables chemical bonding to take place between the aforementioned materials. Furthermore, application of intermediate strata permits a substantial increase in the range of metal or ceramic coatings on moulded plastic parts since it is possible to employ plastics with a low melting point as parent materials while materials melting at high temperatures may be used for coating since the fabric or similar mesh-like material protects the parent material against the thermal properties and effects during flame spraying.

A preferred embodiment of the improved method in accordance with the invention will now be described and is illustrated in the accompanying drawings in which:

FIG. 1 is a perspective view illustrating an application of the method according to the invention, in the production of turbine blading;

FIG. 2 is a partial sectional view along the line A—A of FIG. 1, and

FIG. 3 is a sectional view, to an enlarged scale, along the line B—B of FIG. 1.

Corresponding parts in FIGS. 1 to 3 are provided with the same reference symbols.

In FIG. 1, the numeral 1 refers to a blade of a turbomachine, the foot 3 and the blade 4 being constructed from a plastics parent material, e.g., a synthetic resin and suitable filler material. Fibres 5 are embedded in the synthetic resin and the blading is then moulded into the required shape by hot-pressing or flow-pressing.

Droplet hammer or other effects may readily cause the destruction of such plastic blades since cavitation effects cause more serious damage to such material than to, for example, metal alloys. Entire blade parts may thus be destroyed or splintered, in particular if individual fibres are struck at prestressed positions.

To avoid damage, a protective surface film 2 is usually provided in the illustrated application example, said film extending over a suitable portion of the surface in the region of the inlet edge 7 of the blade. It is, however, also possible for the entire plastics component to be provided with a protective surface film.

The improved method according to the invention is explained by reference to the sectional drawings of FIGS. 2 and 3, the parent material 9 formed of synthetic resin 6 and fibres 5 performing the load supporting or stress-absorbing function. In the embodiment according to the invention, the intermediate stratum 8, applied to the parent material 9, consists of a fabric 10 having warp and weft threads which are laminated with the synthetic resin.

This ensures close bonding between the parent material 9 and the intermediate stratum 8 so that any detachment of individual fibres and fibre groups is prevented.

The fabric 10 or other similar mesh-like material forming the intermediate stratum 8 may be adhesively affixed, either subsequently or, as described above, may be bonded to the parent material 9 simultaneously with the production of the moulded part 1. Advantageous adhesion between the parent material 9 and the intermediate stratum 8 is achieved if the fabric parts or other mesh-like mats 10 are impregnated with adhesives or synthetic resin which will form a chemical bond with the parent material 9.

The protective surface film is applied after the intermediate stratum 8 is applied to the parent material 9. To this end it is assumed that in the normal case the texture of the intermediate stratum 8 resulting from the mesh structure of the fabric mat is sufficient in order to apply the protective coating in suitable manner and with sufficient adhesion.

It has been found particularly advantageous for the surface of the intermediate stratum 8 to be pre-roughened in the case where such stratum is applied to the parent material by means of synthetic resin. This roughening may be achieved, for example, by sand blasting.

FIG. 3 shows to an enlarged scale the manner in which the intermediate stratum 8 is covered by flame-spraying of the protective surface film 2. The reference numeral 9 refers to the parent material comprising the components fibre 5 and synthetic resin 6. Furthermore, the warp threads of the fabric mat are designated with the numeral 10' and the weft threads with the numeral 10'' while the numeral 6' refers to synthetic resin portions which are embedded in the mesh of the fabric. The enlarged view clearly shows the manner in which the intermeshed fabric bonds of the intermediate stratum 8 are removed during flame-spraying at positions 11 without damage of the fibres 5 which perform the load-bearing function.

The thermal effect of protective films of metallic or ceramic substances applied at temperatures of more than 300°C are absorbed by the intermediate stratum so that a barrier is produced relative to the parent material to protect against the otherwise harmful effect of the heat and to prevent the mechanical/technological properties of the plastics material from being impaired.

Organic or inorganic materials such as fibres of polyester, carbon, boron, asbestos, porecelain or glass as well as metallic wires and fabrics or mesh thereof are suitable for use as the fabric, or other mesh-like materials for the intermediate stratum. It is thus possible to employ all materials which satisfy the above mentioned condition of a thermal barrier during application of the protective coating material such as by flame-spraying to the parent plastic material.

The method according to the invention may also be advantageously applied in connection with the production of bearings for exceptionally high rotational speeds. The improved method for applying a surface protective layer to a plastics component may also be useful in conjunction with the production of load supporting structural components of buildings since the erosion resistance is substantially higher than that of conventional plastics girders.

We claim:

1. The method of protecting the surface of a component moulded from a heat-curable fibre-reinforced synthetic resin material by application of a protective film selected from the group consisting of a ceramic, metallic or metallic-ceramic composition and which has a melting point higher than the curing temperature of the synthetic resin which comprises the steps of applying an intermediate layer of a bonding and heat-absorbing material in mesh form to the surface portion of the synthetic resin component, said bonding material being resistant to tempertures higher than the curing temperature of the synthetic resin and thereafter spraying the protective material in a heat-fluidized state onto the surface of said bonding and heat-absorbing layer.

2. The method as defined in claim 1 wherein the application of said intermediate layer of bonding and heat-absorbing material to the surface portion of the fibre-reinforced synthetic resin component is carried out concurrently with the moulding thereof.

3. The method as defined in claim 1 wherein the application of said intermediate mesh layer of bonding and heat-absorbing material to the surface portion of the fibre-reinforced synthetic resin component is carried out concurrently with the moulding thereof and which includes the further step of impregnating said intermediate mesh layer with a synthetic resin forming a chemical bond with the fibre-reinforced synthetic resin component when the latter is moulded and cured.

4. The method as defined in claim 3 and which includes the further step of roughening the intermediate mesh layer prior to impregnation with the synthetic resin.

5. The method as defined in claim 1 wherein said intermediate layer of a bonding and heat-absorbing material is constituted by a metallic wire mesh.

6. The method as defined in claim 1 wherein said intermediate layer of a bonding and heat-absorbing material is constituted by a mesh made from fibres selected from the group consisting of polyester, carbon, boron, asbestos, porecelain and glass.

7. The method as defined in claim 1 wherein the step of applying said layer of a bonding and heat-absorbing material to the surface portion of the moulded synthetic resin component is effected by application of an adhesive therebetween after said component has been moulded.

* * * * *